United States Patent Office 2,951,821
Patented Sept. 6, 1960

2,951,821

PIGMENTED POLYETHYLENE EXTRUSION COMPOSITION

William L. Kesling, Livonia, Mich., assignor to Union Carbide Corporation, a corporation of New York No Drawing. Filed Jan. 23, 1956, Ser. No. 560,893

4 Claims. (Cl. 260—41)

This invention relates to extrudable polyethylene compositions, and more particularly to a composition of polyethylene and a mixture of carbon blacks having low moisture adsorption and high light absorption.

The tough, solid polymers of ethylene are easily degraded by radiant energy such as sunlight, and particularly by ultraviolet light radiation. Such energy catalyzes an oxidation reaction which weakens the material and impairs its electrical properties. For example, unprotected polyethylene subjected to outdoor use and exposed to sunlight loses flexibility and embrittles rather rapidly; it becomes more prone to fatigue failure under stress, its power factor increases, and its surface resistivity drops off.

The properties of articles made from these polymeric compounds of ethylene may be stabilized toward degradation by radiant energy by incorporating chemical "barriers" in the polyethylene compounds. These barriers preferentially absorb the detrimental radiation. Carbon has been found to be the most effective and inexpensive of such chemical barriers.

A good dispersion of fine particle-size carbon black provides good protection to radiation. Decreasing the carbon black's average particle size increases the protection. However, such polyethylene compositions commonly display erratic extrusion characteristics. Extruded profiles are not uniform, but frequently possess rough inside and outside surfaces, or the extruded material contains internal voids. Such articles are unacceptable because of appearance and end-use requirements.

After considerable experimentation and observation, it was found that poor extrudability results from the presence of excessive moisture in the black polyethylene compound. In particular, more than about 0.06 percent moisture causes poor extrusion characteristics. That moisture is the cause of the poor extrusion properties was evidenced by the observation that water has been found in the recesses of the extruder and rust spots appeared on the extruder screws after batches having poor extrusion properties were completed. Drying of the black polyethylene compound prior to extrusion eliminated these short-comings. Examination of voids showed that they were not caused by trapped air as when the extrusion rate is too high, but were caused by moisture.

Further experimentation has shown that the carbon black is responsible for adsorbing the moisture, with the propensity for moisture adsorption increasing with decreasing average particle size.

The desired extrudability behaviors may be restored in any of several ways; however, there are attendant disadvantages to each of these methods.

Exclusion of moist air during manufacture and packaging in moisture-proof containers would make material handling critical throughout and involve excessive costs of special facilities which may be required during manufacture, shipment, storage and extrusion.

Preheating immediately prior to extrusion to eliminate the adsorbed moisture would be highly objectionable from the standpoints of equipment costs, power requirements and space limitations and would still leave the compounds vulnerable to moisture adsorption during unscheduled delays between preheating and extrusion.

Replacing the carbon with other so-called ultraviolet absorbers leads to higher costs and prohibitively reduced weathering resistance.

Omitting the carbon black, as previously indicated, leaves the product unacceptable for outdoor applications.

Decreasing carbon black concentration or poorly dispersing the black or employing large particle size blacks to the extent necessary to reduce the moisture adsorption propensity of the polyethylene compound to an acceptable level generally results in deficient ultraviolet light resistance. While the use of a relatively large particle size black in high concentration can lead to a compound having acceptable moisture adsorption characteristics and ultraviolet light resistance, this expedient results in a less flexible, more brittle material.

It is an object of the present invention to provide a polyethylene composition having properties suitable for extrusion and for outdoor applications.

The object is achieved by preparing a polyethylene composition comprising a tough, solid polymer of ethylene and a mixture of two carbon blacks, said mixture having a mean volume-surface diameter of from 32 to 44 millimicrons.

A polyethylene composition in admixture with from about 1.5 to 5 percent by weight of carbon black having a mean volume-surface diameter of from 32 to 44 millimicrons has a reduced propensity to adsorb moisture as compared to finer blacks, and consistently possesses good extrudability characteristics; in addition, the composition has light absorption properties and physical properties more suitable for outdoor applications than similar compositions containing carbon black of larger particle size.

Very satisfactory compositions have been obtained by adding the carbon black of the herein described particle size range to the polyethylene composition sufficient to yield a composition having an absorption of at least 9000 for 350 millimicron ultraviolet light.

Still more satisfactory compositions have been prepared by adding the carbon black in such amounts, and distributing it throughout the composition in such a manner that the nominal surface area of carbon black is from 1.35 to 3.25 square meters per gram of polymer.

However, to insure maximum extrudability with good light resistance, the preferred carbon black must be added in an amount to provide a minimum absorption coefficient of 9000 for 350 millimicron ultraviolet light and a maximum moisture adsorption of 0.06% at 80° F. and 85% relative humidity.

Table I shows the results of a series of experiments relating to the incorporation of mixtures of two carbon blacks differing in particle size by more than about 10 millimicrons in polyethylene. The first five experiments represent prior art compositions. In the remaining four experiments, the compositions of the present invention are described. In the table, "d" represents the average particle size of the carbon black in millimicrons, D is the mean volume-surface diameter of the carbon as calculated from the equation:

$$D = \frac{\Sigma Wi}{\Sigma (Wi \cdot di)}$$

where $Wi$ is the weight of carbon of average particle size $di$. S is the nominal surface area of the carbon particles in square meters per gram of polyethylene as calculated from the equation:

$$S = \frac{6}{g} \cdot \frac{c}{D}$$

where $g$ is the true density of the particulate material (1.82 for Table I), and $c$ is the weight of carbon per gram of polymer.

well below 9,000 which indicates poor weathering resistance. On the other hand, each of the new compositions is satisfactory in both these respects.

Table I

| Ex. No. | Formulation | | $d$ | $D$ | | $S$ | Compounding Procedure | Percent Moisture Picked up in 72 hrs. at 80° F. and 85% R.H. | Absorption Coefficient for 350 millimicron U.V. Light |
|---|---|---|---|---|---|---|---|---|---|
| | Resin | Carbon | | | | | | | |
| 1 | 99 | 1.0 | 29 | | | 1.2 | standard | 0.029 | 3,400 |
| 2 | 98 | 2.0 | 29 | | | 2.4 | do | 0.041 | 6,000 |
| 3 | 97 | 3.0 | 29 | | | 3.6 | do | 0.090 | 10,700 |
| 4 | 97 | 3.0 | 50 | | | 2.0 | do | 0.037 | 6,000 |
| 5 | 98 | 2.0 | 29 | | | 2.4 | intensive | 0.072 | 10,000 |
| 6 | 97 | { 2.25 / 0.75 } | { 39.4 / 28 } | 36.2 | | 2.8 | standard | 0.041 | 10,800 |
| 7 | 96 | { 3 / 1 } | { 51 / 29 } | 42.8 | | 3.2 | do | 0.045 | 10,900 |
| 8 | 97 | { 2.5 / 0.5 } | { 39.4 / 29 } | 37.2 | | 2.7 | do | 0.038 | 9,000 |

The resin used was DYNH grade polyethylene, which has an approximate molecular weight of 20,000, specific gravity of 0.92 and melt index of 1.6–2.5.

In the standard compounding procedure, the indicated materials were thoroughly mixed and fluxed in a Banbury mixer, further mixed and fluxed and then sheeted on a two roll mill, then cooled and granulated to ⅛–³⁄₁₆″ granules. In the intensive compounding procedure which was designed to provide superior dispersion of the black, the carbon was first intimately mixed and fluxed with a portion of the polyethylene resin and this "masterbatch" was then compounded with the remainder of the resin according to the standard procedure.

Percent moisture pick-up was determined by measuring the weight lost by a representative 20 gram sample of the material when heated 2 hours in a 105° C. circulating air oven. Experiments have shown that the granules reach equilibrium as regards moisture pick-up in 72 hours, and that longer exposures result in no additional moisture adsorption. For instance, the composition of Example 6 adsorbed the same amount of moisture after 168 hours at 80° F. and 85% R.H. (0.041%) as after 72 hours. To all practical intents and purposes therefore, the extrusion behavior of compounds of this sort after 72 hour exposure to the moist environment is illustrative of the worst than can be expected of them under any conditions they are likely to encounter in ordinary commercial usage.

The absorption coefficient ($a$), which is in essence a measure of the fraction of incident radiation absorbed by the carbon, is one way of expressing the extent to which the carbon protects the polyethylene from the damaging ultraviolet rays. It may be calculated conveniently from Bouguer's law which relates the intensity of the transmitted light ($I$) to the intensity of the incident light corrected for radiation losses ($I_0$) and the sample thickness ($t$) by $$I = I_0 e^{-at} \quad (1\text{-}A)$$

By inserting the appropriate correction for the absorption and reflection losses of smooth surfaced, unpigmented polyethylene itself, the absorption coefficient ($a$) becomes equal to, for 350 millimicron radiation, $$\frac{2.3}{t} \log \left( 0.917 \frac{I_0}{I} \right) \quad (2\text{-}A)$$

where $t$ is expressed in inches. Experience has shown that polyethylene compounds with absorption coefficients as defined by (2-A) of less than about 9,000 for 350 millimicron radiation are generally unsuitable for stringent outdoor applications.

It can be seen that each of the prior art compositions is deficient with respect to either moisture adsorption or ultraviolet light resistance, i.e., adsorbs over 0.06% moisture which leads to erratic and unacceptable extrusion characteristics or has a U.V. absorption coefficient The granular products of the preceding examples were "conditioned" for 72 hours at 80° F. and 85% R.H. Their moisture contents were then measured, with the results shown in Table I. The so-conditioned products of Examples 3, 5, 6, 7, 8, and 9 were then extruded into 1-inch I.P.S. (schedule 40) pipe, 1.5 mil film and wire insulations. The corresponding products of Examples 1, 2 and 4 were omitted from these extrusion trials due to prior rejection based on their low ultraviolet absorption coefficients. The extruded articles prepared from 3 and 5 were totally unacceptable. The pipe specimens were porous and had "alligator-back" surfaces, i.e., the entire surface was an irregular pattern of circular and elliptical craters interspersed with occasional crease-like depressions and protrusions. The films were striated with numerous slits and narrow, elongated thin areas which were so thin in many instances as to appear virtually colorless and translucent despite the black pigmentation. The wire insulations contained numerous voids adjacent to the conductor. By contrast, the extruded articles prepared from 6–10 were of satisfactory quality. The pipe specimens were not porous and possessed uniform, smooth, glossy wall surfaces. The films were of uniform thickness, contained no visible defects, and had uniformly black, smooth, glossy surface. The wire insulations were smooth and of uniform thickness throughout, and devoid of any inner or outer surface irregularities.

Allowing for differences in particle size, the type of carbon black used, i.e., channel black, thermal black, furnace black, lamp black, etc., does not seem of particular moment provided there is not present therein some specific, adversely-acting contaminant which tends to sweat out of the resin composition or inhibits good mixing or is otherwise detrimental. While appropriate combinations of channel, thermal, furnace and possibly the smaller particle size lamp blacks are generally preferred because their smaller particle size provides better light screening action, there is no a priori reason why combinations including the larger particle size types such as bone blacks, wood blacks, acetylene blacks, etc. might not also be useful provided the appropriate balance of mean volume-surface diameter and nominal surface area can be accomplished.

In addition, the properties of the composition may be still further improved by the addition of polyethylene modifiers. For example, antioxidants greatly improve the processing of the polyethylene compositions. Hindered phenols and secondary aromatic amines are particularly suitable for this purpose. In an example of such a modified composition, a composition was prepared comprising 96.98 percent by weight of polyethylene, 2.25 percent by weight of carbon black having an average particle size of 39.4 millimicrons, 0.75 percent by weight of carbon having an average particle size of 28 millimicrons, and 0.02 percent by weight of 2,6-di-tert-butyl-p-cresol. Standard compounding procedure was employed. The resultant composition adsorbed 0.048 percent moisture in 72 hours at 80° F. and 85 percent relative humidity. The absorption coefficient was 9,800 for 350 millimicron ultraviolet light.

Other hindered phenols that may be employed as modifiers are 2,6-di-tert-butyl-4-methylphenol, 2,6-di-tert-butyl-4-methoxyphenol, and the thiobis phenols such as bis(2-methyl-4-hydroxy-5-tert-butyl phenyl) sulfide and 2,2-bis-4-(hydroxyphenyl)propane.

Examples of secondary aromatic amines that serve as satisfactory antioxidants are N,N'-diphenyl-p-phenylenediamine and phenyl β-naphthyl amine.

What is claimed is:

1. An extrudable polyethylene composition providing a uniform extruded profile substantially free of internal voids caused by adsorbed moisture, characterized by a minimum absorption coefficient of 9000 for 350 millimicron ultraviolet light and a maximum moisture absorption of 0.06% by weight at 80° F. and 85% relative humidity comprising a tough, solid polymer of ethylene and 1.5 to 5% by weight of a mixture of at least two carbon blacks differing in particle size by more than about 10 millimicrons, said mixture having a mean volume surface diameter of 32 to 44 millimicrons.

2. An extrudable polyethylene comopsition providing a uniform extruded profile substantially free of internal voids caused by adsorbed moisture, characterized by a minimum absorption coefficient of 9000 for 350 millimicron ultraviolet light and a maximum moisture absorption of 0.06% by weight at 80° F. and 85% relative humidity comprising a tough, solid polymer of ethylene and 1.5 to 5% by weight of a mixture of at least two carbon blacks differing in particle size by more than about 10 millimicrons, said mixture having a mean volume surface diameter of from 32 to 44 millimicrons and providing a nominal surface area of from 1.35 to 3.25 square meters per gram of polymer.

3. An extrudable polyethylene composition providing a uniform extruded profile substantially free of internal voids caused by adsorbed moisture and characterized by a minimum absorption coefficient of 9000 for 350 millimicron ultraviolet light and a maximum moisture absorption of 0.06% by weight at 80° F. and 85% relative humidity comprising a tough, solid polymer of ethylene and 3% by weight of a mixture of at least two carbon blacks, differing in particle size by more than about 10 millimicrons, said mixture having a mean volume surface diameter of from 32 to 44 millimicrons.

4. A carbon black pigmented polyethylene composition having a uniform extruded profile substantially free of internal voids caused by adsorbed moisture and characterized by a minimum absorption coefficient of 9000 for 350 millimicron ultraviolet light and a maximum moisture absorption of 0.06% by weight at 80° F. and 85% of relative humidity comprising a tough solid polymer of ethylene and 1.5 to 5% by weight of a mixture of two carbon blacks, one having an average particle size of about 28 millimicrons and the other an average particle size of about 39 millimicrons, said mixture having a mean volume surface diameter of 32 to 44 millimicrons.

References Cited in the file of this patent

UNITED STATES PATENTS

| | | |
|---|---|---|
| 2,316,418 | Habgood | Apr. 13, 1943 |
| 2,512,459 | Hamilton | June 20, 1950 |
| 2,727,879 | Vincent | Dec. 20, 1955 |
| 2,737,502 | Land | Mar. 6, 1956 |

UNITED STATES PATENT OFFICE
CERTIFICATION OF CORRECTION

Patent No. 2,951,821                          September 6, 1960

William L. Kesling

It is hereby certified that error appears in the above numbered patent requiring correction and that the said Letters Patent should read as corrected below.

Column 2, lines 62 to 64, the equation should appear as shown below instead of as in the patent $$D = \frac{\sum W_i}{\sum (W_i/d_i)}$$

Signed and sealed this 23rd day of May 1961.

(SEAL)
Attest:

ERNEST W. SWIDER
Attesting Officer

DAVID L. LADD
Commissioner of Patents